(12) United States Patent
Nagata et al.

(10) Patent No.: US 11,753,914 B2
(45) Date of Patent: Sep. 12, 2023

(54) SLURRY ANALYSIS SYSTEM USING FLOW RESTRICTION

(71) Applicant: NIKON CORPORATION, Tokyo (JP)

(72) Inventors: Takashi Nagata, Castro Valley, CA (US); Ting-Chien Teng, Fremont, CA (US); Kiyoshi Nozaki, Sagamihara (JP); Yohei Konishi, Tokyo (JP)

(73) Assignee: NIKON CORPORATION

( * ) Notice: Subject to any disclaimer, the term of this patent is extended or adjusted under 35 U.S.C. 154(b) by 376 days.

(21) Appl. No.: 17/031,328

(22) Filed: Sep. 24, 2020

(65) Prior Publication Data

US 2021/0087912 A1 Mar. 25, 2021

Related U.S. Application Data

(60) Provisional application No. 62/905,757, filed on Sep. 25, 2019.

(51) Int. Cl.
| | |
|---|---|
| *E21B 43/12* | (2006.01) |
| *E21B 43/25* | (2006.01) |
| *E21B 47/06* | (2012.01) |
| *B01D 46/44* | (2006.01) |
| *G01N 11/04* | (2006.01) |
| *G01N 15/02* | (2006.01) |
| *G01N 15/06* | (2006.01) |

(52) U.S. Cl.
CPC .......... *E21B 43/129* (2013.01); *B01D 46/446* (2013.01); *E21B 43/25* (2013.01); *E21B 47/06* (2013.01); *G01N 11/04* (2013.01); *G01N 15/0272* (2013.01); *G01N 2015/0662* (2013.01)

(58) Field of Classification Search
None
See application file for complete search history.

(56) References Cited

U.S. PATENT DOCUMENTS

| | | | | |
|---|---|---|---|---|
| 5,239,861 A | * | 8/1993 | Fujita | B01D 35/143 |
| | | | | 73/61.73 |
| 9,751,035 B2 | * | 9/2017 | Mitsui | B01D 37/04 |

FOREIGN PATENT DOCUMENTS

| | | | | |
|---|---|---|---|---|
| EP | 3546920 A2 | * | 10/2019 | ............. G01N 15/08 |
| JP | 4-038587 B | * | 1/2008 | ............. G01N 15/06 |
| WO | WO-2016147711 A1 | * | 9/2016 | ............. G01N 15/06 |

\* cited by examiner

*Primary Examiner* — Daniel S Larkin
(74) *Attorney, Agent, or Firm* — ROEDER & BRODER LLP; Steven G. Roeder (57) ABSTRACT

A slurry analysis system (14) for estimating a first characteristic of a slurry (12) having a plurality of particles (18) suspended in a dispersion medium (20) can include a flow restriction assembly (40); a sensor assembly (43) that senses a sensed condition of the slurry (12) as it flows through the flow restriction assembly (40); and a control and analysis system (26) that estimates the first characteristic of the slurry (12) based on the sensed condition. Further, the control and analysis system (26) can select a selected clogging behavior using the sensed condition, and estimate the first characteristic based on the selected clogging behavior.

15 Claims, 7 Drawing Sheets

SLURRY ANALYSIS SYSTEM USING FLOW RESTRICTION

CROSS-REFERENCE TO RELATED APPLICATIONS

This application claims priority on U.S. Provisional Patent Application Ser. No. 62/905,757, entitled "SLURRY ANALYSIS SYSTEM USING FLOW RESTRICTION", filed on Sep. 25, 2019. As far as permitted, the contents of U.S. Provisional Patent Application Ser. No. 62/905,757 are incorporated herein by reference.

BACKGROUND

Manufacturing fluids, such as slurries, are used in many manufacturing processes. For example, an abrasive particle slurry can be used to polish a workpiece, such as a lens. In this example, the abrasive particle slurry can be an aqueous solution that carries a high concentration of nanoscale abrasive particles. The abrasive particle slurry can play a number of critical roles in the polishing of the workpiece. For example, the chemical composition of the abrasive particle slurry can alter the surface properties of the workpiece, soften the workpiece surface and make it amenable to material removal. Further, the abrasive particles in the abrasive particle slurry can remove material from the workpiece surface by cutting nanoscale grooves in the workpiece surface. As a result thereof, the composition of the abrasive particle slurry can significantly influence the quality of the polishing of the workpiece.

In another example, a ceramic casting slurry can be used in a ceramic mold casting to form an object. In this example, the composition of the ceramic casting slurry will again significantly influence the quality of the object.

Accordingly, it is important to monitor the composition of the slurry during the manufacturing process. One method to analyze the slurry is with optics-based particle detection techniques. However, because of the high particle concentrations of the slurries, it difficult to optically analyze the slurry without aggressively diluting the slurry. Stated in another fashion, the optics-based particle detection techniques suffer from the shortcoming where light cannot probe into slurries at high particle concentrations at which the slurries are most useful. Thus, pre-manipulation, such as dilution, becomes a necessary conventional practice.

Unfortunately, the dilution of the slurry can alter the key properties of the slurry, before they can be properly detected and measured. This compromises the integrity of the measurements taken on the slurry, and renders the monitoring results less suitable for representing the original slurry before manipulation. Further, optics-based particle detection techniques are expensive to make and operate.

The lack of good, inexpensive monitoring methods for the slurry results in flawed management and control of the quality of the slurry, as well as a higher cost of fluid manufacturing. Accordingly, there is a need for an analysis system that accurately analyzes the slurry.

SUMMARY

The present invention is directed to a slurry analysis system for estimating a first characteristic of a slurry that includes a plurality of particles suspended in a dispersion medium. The slurry analysis system can include a flow restriction assembly; a sensor assembly that senses a sensed condition of the slurry as it flows through the flow restriction assembly; and a control and analysis system that estimates the first characteristic of the slurry based on the sensed condition.

As an overview, the present slurry analysis system is designed to analyze the slurry at ready-to-use conditions, under original conditions, and without diluting the slurry. This greatly simplifies the analysis and enables accurate monitoring of slurry as well as processes for fluid synthesis.

In one embodiment, the control and analysis system selects a selected clogging behavior using the sensed condition, and estimates the first characteristic based on the selected clogging behavior. Further, the control and analysis system can estimate an observed fluid flux using the sensed condition and select the selected clogging behavior using the observed fluid flux.

For example, the sensor assembly can measure a pressure differential across the flow restriction assembly over time, and a flow rate through the flow restriction assembly over time, and the control and analysis system can estimate the viscosity versus time using the pressure differential and flow rate.

In one embodiment, the control and analysis system uses the observed fluid flux to select the selected clogging behavior between a first clogging behavior and a second clogging behavior. In certain implementations, the control and analysis system estimates the observed fluid flux using the formula:

$$= \frac{dv}{dt},$$

wherein (i) q is the observed fluid flux; and (ii)

$$\frac{dv}{dt}$$

is the time derivative of the passed fluid volume per area of the flow restriction assembly.

As provided herein, the control and analysis system can estimate at least one of particle count, particle size and agglomeration using the selected clogging behavior. For example, the control and analysis system can estimate a particle count, a particle size and agglomeration using the selected clogging behavior.

As non-exclusive examples, the flow restriction assembly can include a capillary array and/or a filter.

The slurry analysis system can be used as part of a manufacturing assembly that includes a manufacturing system. Additionally, or alternatively, the slurry analysis system can be used with a slurry source that includes a receptacle that retains the slurry to monitor the characteristics of the slurry.

In another embodiment, the present invention is directed to a method for estimating a first characteristic of a slurry. The method can include directing the slurry at a flow restriction assembly; sensing a sensed condition of the slurry with a sensor assembly as it flows through the flow restriction assembly; and estimating the first characteristic of the slurry based on the sensed condition with a control and analysis system.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
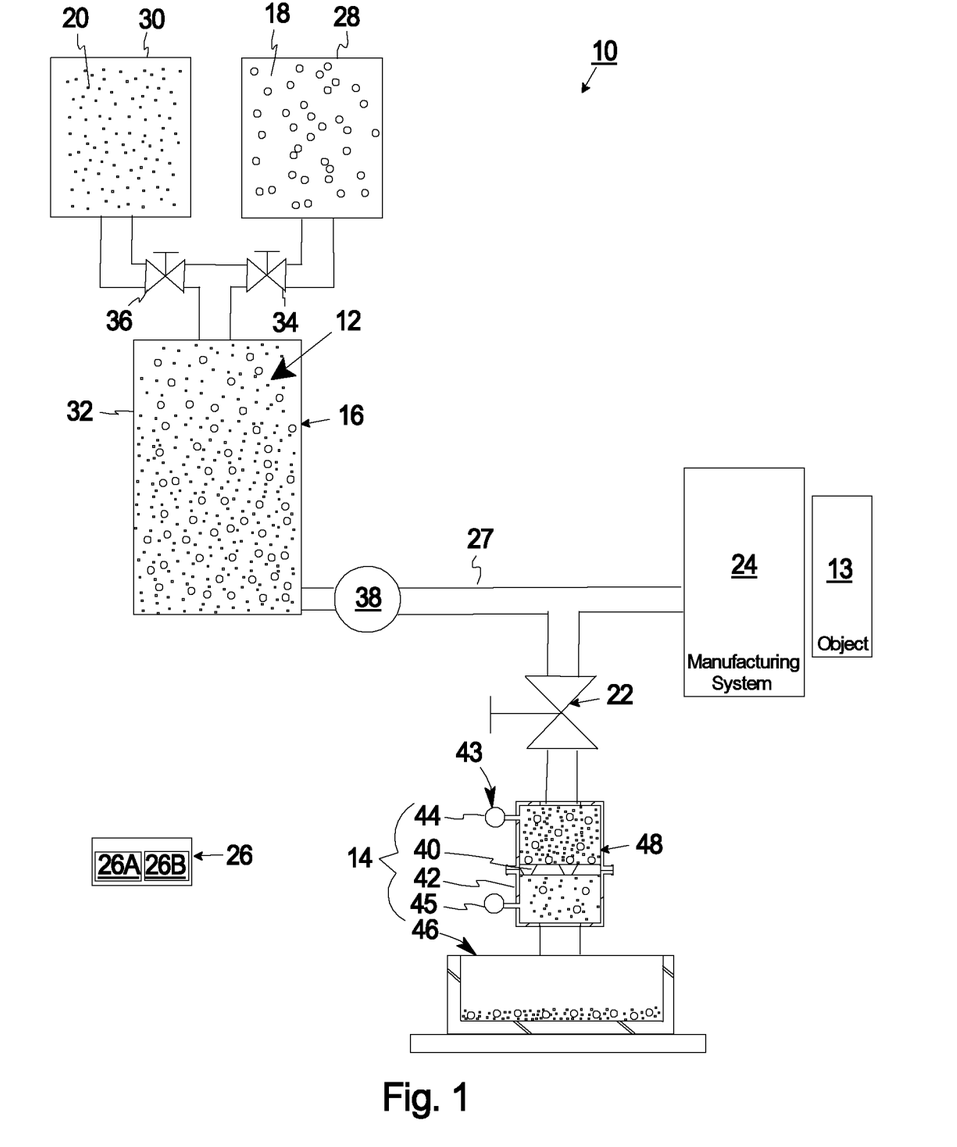
FIG. 1 is a simplified illustration of a manufacturing assembly having features of the present invention.

FIG. 1 is a simplified illustration of a manufacturing assembly 10 that uses a slurry 12 (illustrated with small squares and circles) for manufacturing an object 13 (illustrated as a box and sometimes referred to as a workpiece). In many manufacturing assemblies 10 that use a slurry 12, the composition of the slurry 12 can significantly influence the quality of the manufactured object 13. In FIG. 1, the manufacturing assembly 10 includes a unique slurry analysis system 14 (illustrated in cut-away) that accurately monitors and estimates one or more characteristics of the slurry 12. With this information, for example, the composition of the slurry 12 and/or the manufacturing assembly 10 can be adjusted as necessary to achieve the desired characteristics of the object 13. For example, with the improved monitoring capability of the slurry analysis system 14, a slurry source 16 of the slurry 12 can be readily adjusted and controlled so as to realize the desired performance. This can reduce the occurrences of polishing scratches by using an accurate slurry 12 mixture. Alternatively, for example, with the improved monitoring capability of the slurry analysis system 14, a ceramic casting product made with the slurry 12 will be more accurate. In summary, the slurry analysis system 14 can be used to improve product quality management and control, manufacturing efficiency and cost.

The slurry analysis system 14 provided herein can analyze the properties of the slurry 12 at ready-to-use conditions, and without diluting the slurry 12. This greatly simplifies the analysis and enables accurate monitoring of slurry 12 as well as processes for fluid synthesis. Moreover, the slurry analysis system 14 can use a generic scale to quantitatively compare a variety of slurries 12 and its processes.

As an overview, in certain embodiments, the slurry analysis system 14 uses a flow restriction methodology that is simple and has no moving parts to determine viscosity using pressure drop and fluid flow. Subsequently, using theoretical models and the viscosity, a clogging behavior of the slurry 12 can be estimated. Next, using the clogging behavior, the particle contents properties of the slurry 12, such as particle counts, size, and agglomeration can be estimated by the application of relationships between the properties and the clogging behavior. This methodology is robust and can be used with high particle concentration, highly viscous slurries 12 that pose challenges using other methods.

The type of slurry 12 used can be varied to suit the requirements of the manufacturing assembly 10. In certain embodiments, the slurry 12 includes a plurality of particles 18 (illustrated with small circles) suspended in a dispersion medium 20 (illustrated with small squares). With this design, the properties of the particles 18 and the dispersion medium 20 can be varied to suit the requirements of the manufacturing assembly 10.

For example, the slurry 12 can be an abrasive slurry 12 that is used in the polishing of the object 13. In this design, the size, shape and the material of the particles 18 and the composition of the dispersion medium 20 can be selected to achieve the desired properties of the abrasive slurry 12. For example, the chemical composition of the dispersion medium 20 can alter the surface properties of the object 13, soften the object 13, and make it amenable to material removal. Further, the size and shape of the abrasive particles 18 influence the material removal from the surface of the object 13.

As another non-exclusive example, the slurry 12 can be a ceramic casting slurry that is used to form the object 13. Similar to the example above, the size, shape and the material of the particles 18 and the composition of the dispersion medium 20 can be selected to achieve the desired properties of the ceramic casting slurry 12.

As non-exclusive examples, the particles 18 can be made of ceramic materials, solid crystals, solid metals or solid polymers. Further, as non-exclusive examples, the dispersion medium 20 can be a liquid, such as deionized water, water-based solution of various solutes, organic solvent, or another type of liquid.

The design of the manufacturing assembly 10 can be varied to suit the type of object 13 that is being manufactured. In the simplified, non-exclusive example illustrated in FIG. 1, the manufacturing assembly 10 includes the slurry source 16, a diversion valve 22, a manufacturing system 24 (illustrated as a box), a control and analysis system 26, and the slurry analysis system 14. Alternatively, the manufacturing assembly 10 can include more or fewer components than illustrated in FIG. 1. For example, the slurry analysis system 14 can be used with the slurry source 16 without the manufacturing system 24.

In the embodiment illustrated in FIG. 1, the manufacturing assembly 10 also includes one or more fluid conduits 27 that connect the various components in fluid communication with each other.

The slurry source 16 provides the slurry 12 to the manufacturing assembly 10. In the non-exclusive example illustrated in FIG. 1, the slurry source 16 includes (i) a particle receptacle 28 that retains the particles 18, (ii) a medium receptacle 30 that retains the dispersion medium 20, (iii) a mixing receptacle 32 that mixes the particles 18 and the dispersion medium 20 to create the slurry 12, (iv) a particle valve 34 that selectively controls the amount of particles 18 that are added to the mixing receptacle 32, and (v) a medium valve 36 that selectively controls the amount of dispersion medium 20 that is added to the mixing receptacle 32. With this design, the control and analysis system 26 can selectively control the valves 34, 36 to selectively control the composition of the slurry 12.

In an alternative embodiment, the slurry 12 is premixed and provided to the slurry analysis system 14 and/or the manufacturing system 24 without the particle receptacle 28 and the medium receptacle 30.

Additionally, the slurry source 16 can include one or more fluid pumps 38 that provide pressurized slurry 12 to the manufacturing system 24 and/or the slurry analysis system 14.

The diversion valve 22 is used to selectively divert some of the slurry 12 to the slurry analysis system 14. For example, the diversion valve 22 can be a valve that is manually controlled or electronically controlled by the control and analysis system 26 to selectively divert some of the slurry 12 for analysis by the slurry analysis system 14. Alternatively, the slurry analysis system 14 can be in-line with the flow of the slurry 12 to the manufacturing system 24.

The type of manufacturing system 24 can be varied. In one, non-exclusive embodiment, the manufacturing system 24 is a polishing assembly that uses an abrasive slurry 12 to polish the object 13. In an alternative, non-exclusive example, the manufacturing system 24 is a casting system that injects a ceramic casting slurry 12 into a mold to form the object 13.

The control and analysis system 26 controls one or more of the components of the manufacturing assembly 10. Additionally, or alternatively, the control and analysis system 26 can use information from the slurry analysis system 14 to monitor and estimate one or more characteristics of the slurry 12. For example, the control and analysis system 26 can include one or more processors 26A (only one is illustrated as a box) and one or more electronic storage devices 26B (only one is illustrated as a box).

In the non-exclusive embodiment in FIG. 1, the control and analysis system 26 is illustrated as a centralized system. Alternatively, for example, the control and analysis system 26 can be a distributed system with a separate processor used as part of the slurry analysis system 14 to calculate the one or more characteristics of the slurry 12. Still alternatively, the control and analysis system 26 can be a separate computer or processor, such as a laptop.

The slurry analysis system 14 collects information that is used for estimating one or more characteristics of the slurry 12. In the non-exclusive example illustrated in FIG. 1, the slurry analysis system 14 includes a flow restriction assembly 40, an assembly housing 42, and a sensor assembly 43 that senses one or more sensed conditions of the slurry 12. The design of each of these components can be varied. Further, the slurry analysis system 14 can include more or fewer components than are illustrated in FIG. 1.

For example, the sensor assembly 43 can include an inlet pressure sensor 44, an outlet pressure sensor 45, and a flow sensor 46. With this design, the sensed conditions can include (i) a slurry inlet pressure, (ii) a slurry outlet pressure, (iii) a pressure differential between the inlet pressure and the outlet pressure, and/or (iv) a flow rate.

Figure 2:
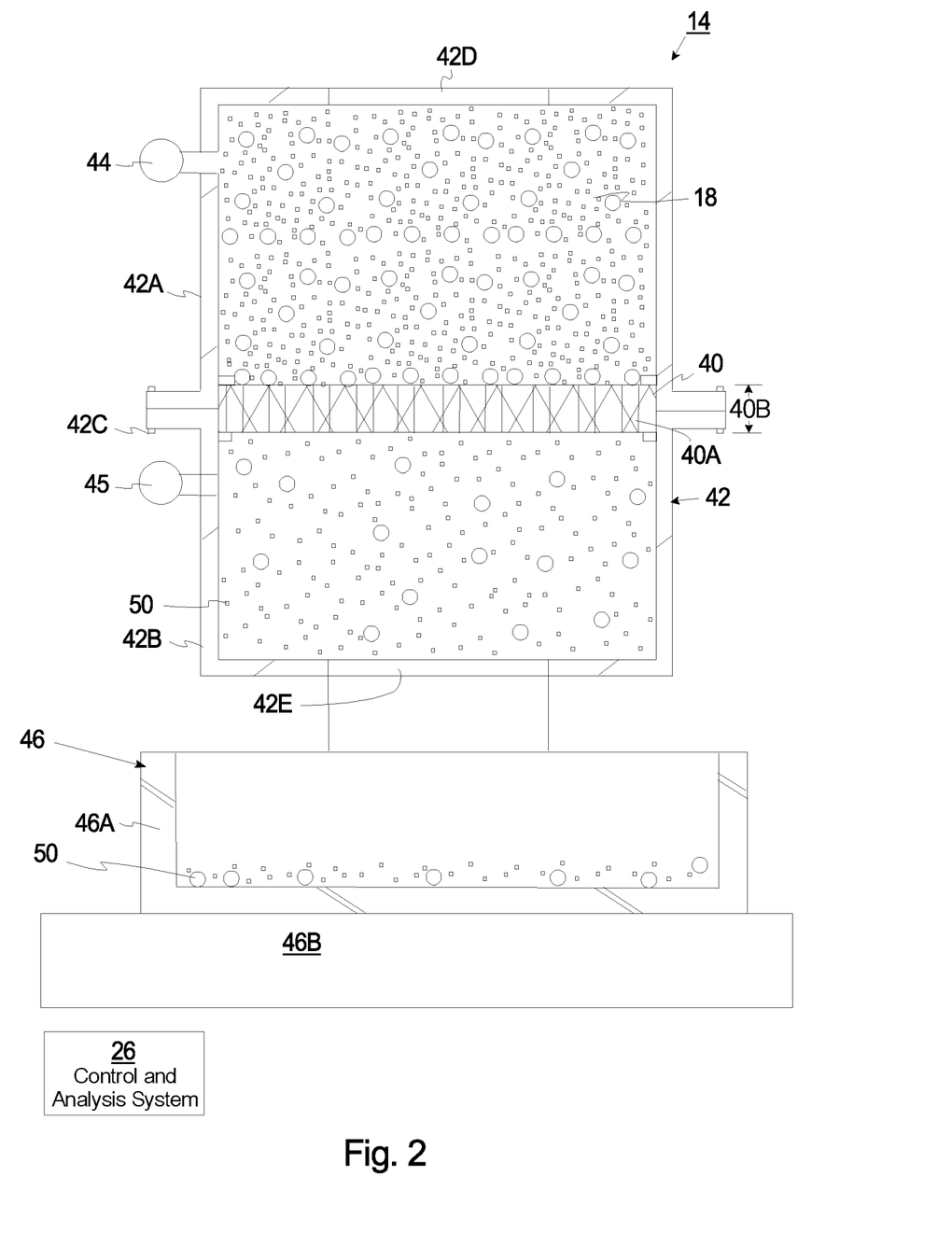
FIG. 2 is a simplified illustration of a slurry analysis system of the manufacturing assembly of FIG. 1.

FIG. 2 is an enlarged cut-away view of the slurry analysis system 14 including the flow restriction assembly 40, the assembly housing 42, the pressure sensors 44, 45, the flow sensor 46, and the control and analysis system 26.

As an overview, the slurry analysis system 12 can determine the one or more characteristics of the slurry 12 by directing the slurry 12 through the flow restriction assembly 40. In this embodiment, the control and analysis system 26 can estimate one or more characteristics of the slurry 12 using (i) the flow rate of a filtrate 50 through the flow restriction assembly 40, (ii) the slurry inlet pressure of the slurry 12, (iii) the slurry outlet pressure of the slurry; (iv) the pressure differential, and/or (v) a viscosity of the filtrate 50.

The flow restriction assembly 40 restricts the flow of the slurry 12. The properties of the flow restriction assembly 40 are selected to correspond to the properties of the slurry 12. In one non-exclusive embodiment, the flow restriction assembly 40 is a filter that restricts the flow of the slurry 12. In this embodiment, the filter 40 can be a disk shaped, membrane filter that includes a plurality of pores 40A (also referred to as flow passageways) that are illustrated as holes through the filter for simplicity. As alternative, non-exclusive examples, the flow restriction assembly 40 can have a pore size of less than 100, 10, 5, or 1 micron. However, other sizes and designs are possible. Moreover, the flow restriction assembly 40 has a thickness 40B that represents a flow length for the slurry 12 through the flow restriction assembly 40. As alternative, non-exclusive examples, the flow restriction assembly 40 can have a thickness 40B or flow length of approximately 0.2, 1, 2, 10, 20, 50, 100, 200, or 500 millimeters. However, other thicknesses 40B or flow lengths can be used.

Figure 3:
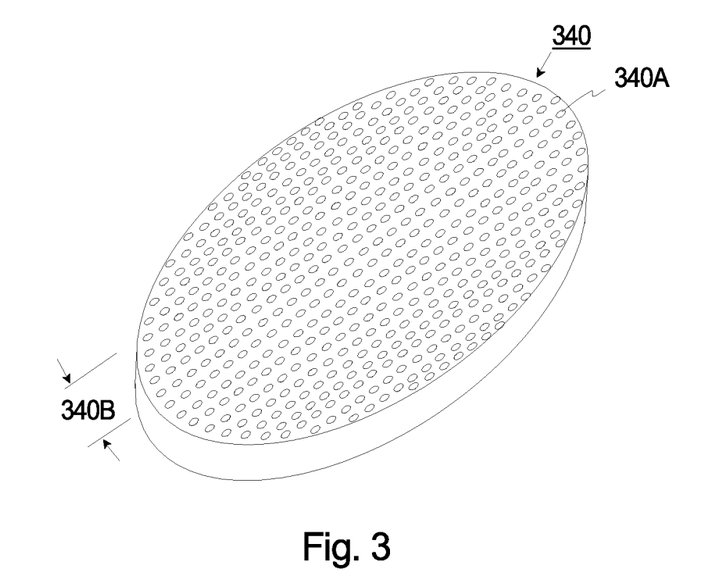
FIG. 3 is a simplified illustration of a flow restriction assembly.

Alternatively, the flow restriction assembly 40 can have another configuration. For example, as illustrated in FIG. 3, the flow restriction assembly 340 can be capillary array. In this, non-exclusive example, the capillary array 340 is disk shaped and includes a plurality of uniformly spaced apart flow passageways 340A (holes) that are sized to achieve the desired flow restrictions. For example, the flow passageways 340A can each have a radius of between 0.5 to 500 microns. As alternative, non-exclusive examples, the flow passageways 340A can each have a radius of less than 0.5, 1, 2, 10, 20, 50, 100, 200, or 500 microns. However, other sizes can be used.

Further, the capillary array 340 has a thickness 340B that represents a flow length for the slurry 12 through the flow restriction assembly 340. For example, the flow passageways 340A can each have a flow length of between 0.2 to 500 millimeters. As alternative, non-exclusive examples, the flow passageways 340A can each have a thickness 340B or flow length of approximately 0.2, 1, 2, 10, 20, 50, 100, 200, or 500 millimeters. However, other thicknesses 340B or flow lengths can be used.

In one, non-exclusive embodiment, the capillary array 340 has an open area ration of fifty-five percent or greater.

Referring back to FIG. 2, the assembly housing 42 (also sometimes referred to as a "filter housing") retains the flow restriction assembly 40. In the non-exclusive embodiment illustrated in FIG. 2, the filter housing 40 is rigid, generally hollow cylindrical shaped. Alternatively, the filter housing 42 can have another configuration. In one embodiment, the filter housing 42 can include a transparent region (or is completely transparent) to allow for the viewing into the filter housing 42.

Further, the filter housing 42 can be separable to allow the flow restriction assembly 40 to be installed and/or removed. In the non-exclusive embodiment illustrated in FIG. 2, the filter housing 42 includes a first housing part 42A, a second housing part 42B, and one or more housing attachers 42C (e.g. bolts) that can be used to selectively attach the housing parts 42A, 42B. In this embodiment, the housing parts 42A, 42B cooperate to selectively retain the flow restriction assembly 40.

It should be noted that the filter housing 42 can include a filter inlet 42D in which the slurry 12 is directed into the filter housing 42 and a filter outlet 42E in which the filtrate 50 exits the filter housing 42.

The inlet pressure sensor 44 measures the slurry filtration pressure of the slurry 12 before the flow restriction assembly 40. In this embodiment, the inlet pressure sensor 44 measures the pressure in the filter housing 42 above and near the flow restriction assembly 40, and near the filter inlet 42D.

It should be noted that in FIG. 1, the pressure of the slurry 12 above the flow restriction assembly 40 is provided by the pump 38. Alternatively, a separate air pump or other type of pump can be used to apply a substantially constant pressure to the slurry 12 above the flow restriction assembly 40. As a non-exclusive example, the constant pressure can be approximately ten pounds per square inch.

The outlet pressure sensor 45 measures the slurry filtration pressure of the slurry 12 after the flow restriction assembly 40. In this embodiment, the outlet pressure sensor 45 measures the pressure in the filter housing 42 below and near the flow restriction assembly 40, and near the filter outlet 42E.

It should be noted that in FIG. 1, the difference between the inlet pressure and the outlet pressure is the pressure differential (or pressure drop) across the flow restriction assembly 40.

The flow sensor 46 measures the flow of the filtrate 50 through the flow restriction assembly 40. The design of the flow sensor 46 can vary. In the non-exclusive embodiment illustrated in FIG. 2, the flow sensor 46 includes a filtrate receptacle 46A that collects the filtrate 50 that exits the filter outlet 42E and a scale 46B that weights the filtrate 50 that has passed through the flow restriction assembly 40. With this design, the weight of the filtrate 50 that has passed through the flow restriction assembly 40 can be used to calculate the flow rate of the filtrate 50. Alternatively, the flow sensor 46 can be a flow meter located along the flow path.

In one embodiment, a first characteristic of the slurry 12 that is estimated with the control and analysis system 26 is a viscosity. In this embodiment, the control and analysis system 26 can estimate the viscosity using (i) the flow rate of the filtrate 50 through the flow restriction assembly 40, (ii) the inlet pressure of the slurry 12, (iii) the outlet pressure of the slurry 12.

The formula used by the control and analysis system 26 to calculate the viscosity can be varied. In one embodiment, the Hagen-Poiseuille equation can be rewritten as provided below, and can be used by the control and analysis system 26 to estimate the viscosity:

$$\mu = \frac{\Delta P \pi R^4}{8LQ}. \quad \text{Equation (1)}$$

In Equation (1) and elsewhere (i) $\Delta P$ is the pressure drop across flow restriction assembly 40 (pressure differential between the inlet pressure and the outlet pressure); (ii) L is the flow length 40B (thickness of the flow restriction assembly 40); (iii) $\mu$ is the dynamic viscosity; (iv) Q is the volumetric flow rate; and (v) R is the radius of the flow passageways. Thus, the dynamic pressure drop (pressure differential over time) across the flow restriction assembly 40 has a direct correlation with the dynamic viscosity (how the viscosity varies over time) of the slurry 12. With this design, the dynamic viscosity of the slurry 12 can be accurately monitored by monitoring the dynamic pressure drop and the dynamic flow rate (how the flow rate varies over time). Moreover, this type of estimation of the dynamic viscosity is relatively robust and can be used with any fluid, including fluids that are very viscous. For example, this arrangement can be used to monitor dynamic viscosity for a slurry 12 that is relatively thick (lots of particles 18) and has a relatively high viscosity.

Additionally, as discussed below, the slurry analysis system 14 can be used to estimate one or more characteristics of the slurry 12, including one or more of (i) particle count, (ii) particle size, and (iii) agglomeration.

Figure 4A:
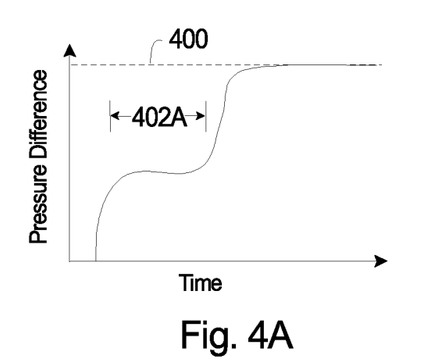
FIG. 4A is a graph that plots how the pressure difference varies over time for a first slurry directed through the flow restriction assembly.
Figure 4B:
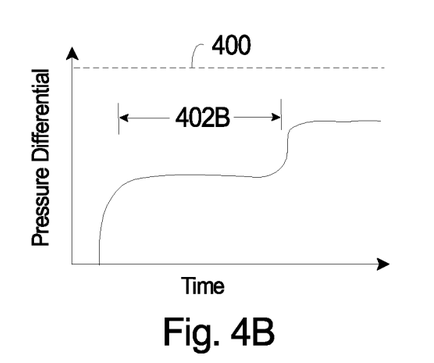
FIG. 4B is a graph that plots how the pressure difference varies over time for a second slurry directed through the flow restriction assembly.
Figure 4C:
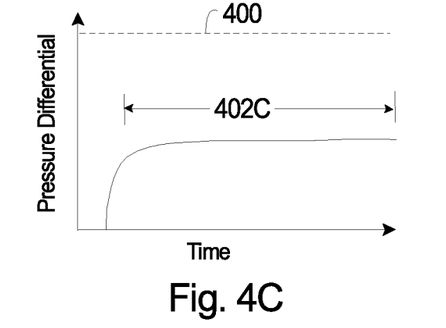
FIG. 4C is a graph that plots how the pressure difference varies over time for a third slurry directed through the flow restriction assembly.

FIG. 4A is a graph that plots how the pressure differential varies over time for a first slurry directed through the flow restriction assembly (not shown). Further, FIG. 4B is a graph that plots how the pressure differential varies over time for a second slurry directed through the flow restriction assembly (not shown). Moreover, FIG. 4C is a graph that plots how the pressure differential varies over time for a third slurry directed through the flow restriction assembly (not shown). In these Figures, dashed line 400 represents a maximum pressure difference that occurs when the flow restriction assembly is plugged.

In FIG. 4A, the first slurry caused the pressure difference across the flow restriction assembly to escalate relatively quickly to the maximum pressure 400. Further, reference 402A indicates that the pressure difference was steady for only a short amount of time for the first slurry. Thus, the profile of FIG. 4A indicates that the first slurry was relatively thick and quickly clogged the flow restriction assembly.

Somewhat similarly, in FIG. 4B, the second slurry caused the pressure difference across the flow restriction assembly to escalate some, but nearly as quickly as the first slurry in FIG. 4A. Further, reference 402B indicates that the pressure difference was steady for a longer amount of time for the second slurry than the first slurry. Thus, the profile of FIG. 4B indicates that the second slurry is still relatively thick, but not nearly as thick as the first slurry.

Finally, in FIG. 4C, the third slurry caused the pressure difference across the flow restriction assembly to escalate a little, but nearly as quickly as the second slurry in FIG. 4B. Further, reference 402C indicates that the pressure difference was steady for a longer amount of time for the third slurry than the second slurry. Thus, the profile of FIG. 4C indicates that the third slurry is not nearly as thick as the second slurry.

Generally speaking, slurries with lots of larger particles will result in a rapidly escalating pressure differential across the flow restriction assembly and a rapidly decreasing flow rate through the flow restriction assembly. Thus, by monitoring pressure differential and flow rate (e.g. clogging behavior of the flow restriction assembly), one or more characteristics of the slurry can be estimated by the control and analysis system 26.

Additionally, as provided herein, the control and analysis system 26 can use the monitored pressure differential and flow rate to select a clogging behavior of the slurry 12 as it flows through the flow restriction assembly 40. The selected clogging behavior can be picked from a plurality of possible blocking behaviors. Subsequently, the control and analysis system 26 can identify one or more additional characteristics of the slurry 12 based on the selected clogging behavior of the slurry 12.

As provided herein, the rate and method in which the slurry 12 clogs the flow restriction assembly 40 will vary according to the type and composition of the slurry 12. The present disclosure discusses four different, possible clogging behaviors (types) that occur when the slurry 12 is directed at the flow restriction assembly 40. These four, different possible clogging behaviors can be referred to as (i) a complete clogging behavior; (ii) an intermediate clogging behavior; (iii) a standard clogging behavior; and (iv) a cake filtration clogging behavior. It should be noted that the number of different possible clogging behaviors can be expanded to more than four or reduced to less than four possible clogging behaviors. Further, any of these possible clogging behaviors can be referred to as a first, second, third, or fourth clogging behavior.

Moreover, for each clogging behavior, there exists a different fluid flux profile. Any of these different fluid flux profiles can be referred to as a first, second, third, or fourth fluid flux profile.

Figure 5A:
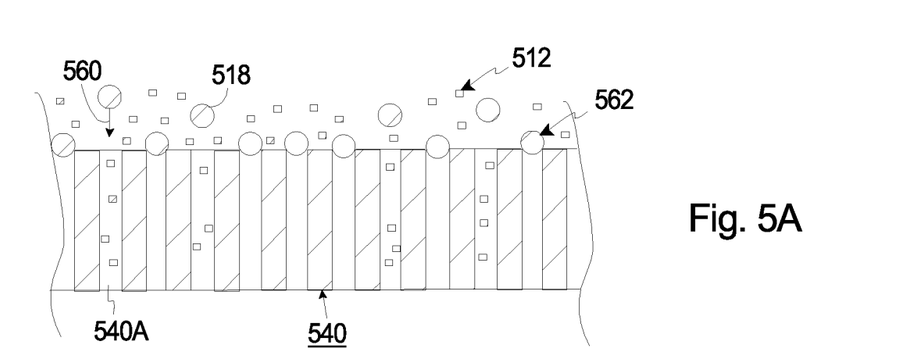
FIG. 5A illustrates the flow restriction assembly during a first clogging behavior.

FIG. 5A is a simplified illustration of a portion of a flow restriction assembly 540 (in cut-away) having a plurality of flow passageways 540A, with a first slurry 512 (illustrated with small squares and circles) including first particles 518 directed from top to bottom (illustrated with an arrow 560) through the flow restriction assembly 540. In this example, the first particles 518 are relatively large, with many first particles 518 having a diameter that is larger than the diameter of each flow passageway 540A. As a result thereof, each flow passageway 540A will be quickly plugged by a separate, single first particle 518. This type of clogging behavior is referred to herein as complete clogging behavior 562. With complete clogging behavior 562, the first particles 518 are large and do not tend to stick to each other (no agglomeration). The complete clogging behavior 562 can be referred to as the first clogging behavior.

Figure 5B:
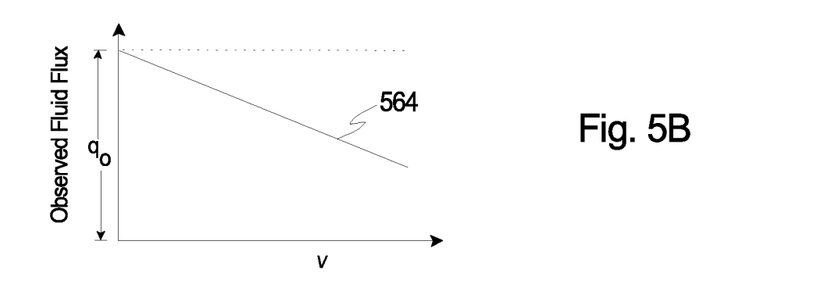
FIG. 5B illustrates a first fluid flux profile.

FIG. 5B is a graph that plots a fluid flux profile 564 that occurs during the complete blocking behavior 562 (illustrated in FIG. 5A). In FIG. 5B, an observed fluid flux (q) is plotted relative to a passed fluid volume per area of the flow restriction assembly (v). As used herein, the term "observed fluid flux" shall mean a time derivative of the passed fluid volume per area of the flow restriction assembly, or, in other words, passed fluid flow rate per area of the flow restriction assembly. The observed fluid flux can be represented by equation $$= \frac{dv}{dt},$$

where v is the passed fluid volume per area of the flow restriction assembly, and where t is time. As illustrated in FIG. 5B, the observed fluid flux of the slurry decreases linearly (for complete clogging behavior) as the amount of flow through the flow restriction assembly increases. In FIG. 5B, $q_o$ is the initial value of the observed fluid flux q, and the observed fluid flux has a slope of $-K_b$, where $K_b$ is some positive value. The fluid flux profile 564 illustrated in FIG. 5B can be referred to as the first fluid flux profile.

Figure 6A:
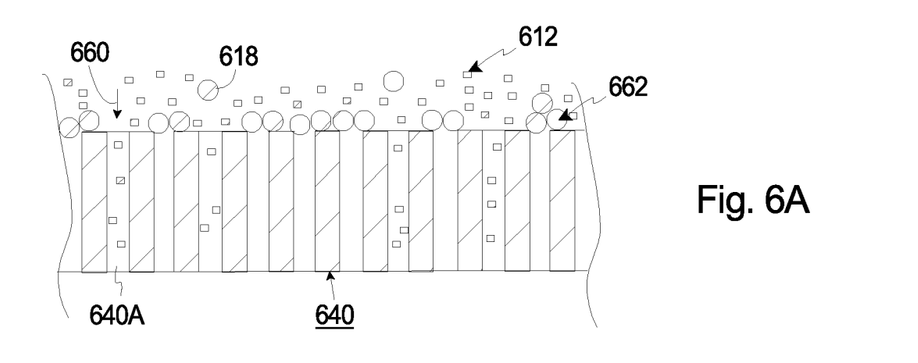
FIG. 6A illustrates the flow restriction assembly during a second clogging behavior.

FIG. 6A is a simplified illustration of a portion of the flow restriction assembly 640 (in cut-away) having the plurality of flow passageways 640A, with a second slurry 612 (illustrated with small squares and circles) including second particles 618 directed from top to bottom (illustrated with an arrow 660) through the flow restriction assembly 640. In this example, the second particles 618 are large, and multiple second particles 618 can attach to each other and cooperate to block each of the flow passageways 640A. Stated in another fashion, in this example, some large second particles 618 may attach to other second particles 618 that have already plugged up flow passageways 640A therefore not directly contributing to clogging. As a result thereof, each flow passageway 640A will be partly plugged pretty quickly, and subsequently will become fully plugged by multiple second particles 618. This type of clogging behavior is referred to herein as intermediate clogging behavior 662. With intermediate clogging behavior 662, the second particles 618 are large and tend to stick to each other (agglomeration). The intermediate clogging behavior 662 can be referred to as the second clogging behavior.

Figure 6B:
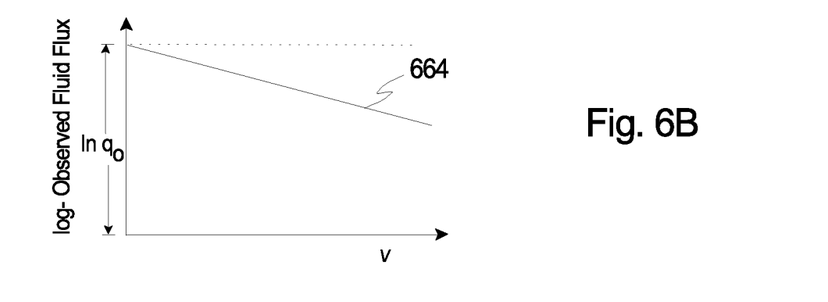
FIG. 6B illustrates a second fluid flux profile.

FIG. 6B is a graph that plots a fluid flux profile 664 that occurs during the intermediate clogging behavior 662 (illustrated in FIG. 6A). In FIG. 6B, the logarithm of the observed fluid flux (ln q) is plotted relative to the passed fluid volume per area of the flow restriction assembly (v). As illustrated in FIG. 6B, the logarithm of the observed fluid flux of the slurry decreases linearly (for intermediate clogging behavior) as the amount of flow through the flow restriction assembly increases. In FIG. 6B, ln $q_o$ is the logarithm of the initial value of the observed fluid flux q, and the logarithm of the observed fluid flux has a slope of $-K_i$, where $K_i$ is some positive value. The fluid flux profile 664 illustrated in FIG. 6B can be referred to as the second fluid flux profile.

Figure 7A:
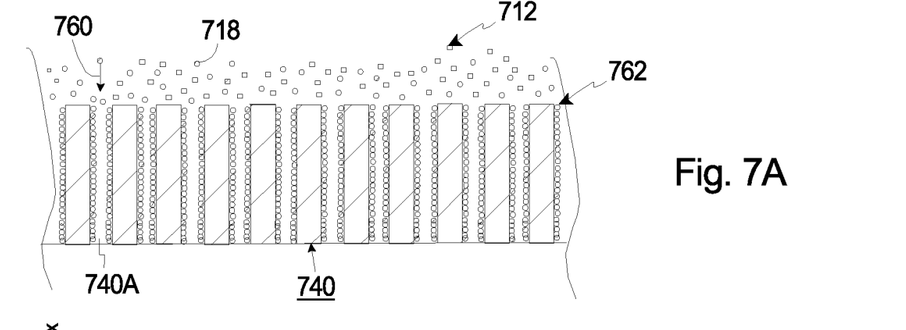
FIG. 7A illustrates the flow restriction assembly during a third clogging behavior.

FIG. 7A is a simplified illustration of a portion of the flow restriction assembly 740 (in cut-away) having the plurality of flow passageways 740A, with a third slurry 712 (illustrated with small squares and circles) including third particles 718 directed from top to bottom (illustrated with an arrow 760) through the flow restriction assembly 740. In this example, the third particles 718 are small, and have diameters that are smaller than the diameter of the flow passageways 740A. However, the third particles 718 tend to attach to the inner walls of the flow passageways 740A and over time, the particles 718 cooperate to effectively narrow down and eventually fully block the flow passageways 740A. As a result thereof, each flow passageway 740A will gradually move from fully opened to being plugged. This type of clogging behavior is referred to herein as standard clogging behavior 762. With standard clogging behavior 762, the third particles 718 are small and tend to stick to each other (agglomeration). The standard clogging behavior 762 can be referred to as the third clogging behavior.

Figure 7B:
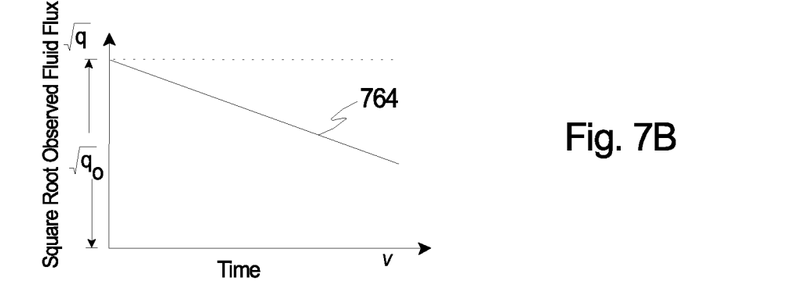
FIG. 7B illustrates a third fluid flux profile.

FIG. 7B is a graph that plots a fluid flux profile 764 that occurs during the standard clogging behavior 762 (illustrated in FIG. 7A). In FIG. 7B, the square root of the observed fluid flux ($\sqrt{q}$) is plotted relative to the passed fluid volume per area of the flow restriction assembly (v). As illustrated in FIG. 7B, the square root of the observed fluid flux of the slurry decreases linearly (for standard clogging behavior) as the amount of flow through the flow restriction assembly increases. In FIG. 7B, $\sqrt{q_o}$ is the square root of the initial value of the observed fluid flux q, and the square root of the observed fluid flux has a slope of $-K_s$, where $K_s$ is some positive value. The fluid flux profile 764 illustrated in FIG. 7B can be referred to as the third fluid flux profile.

Figure 8A:
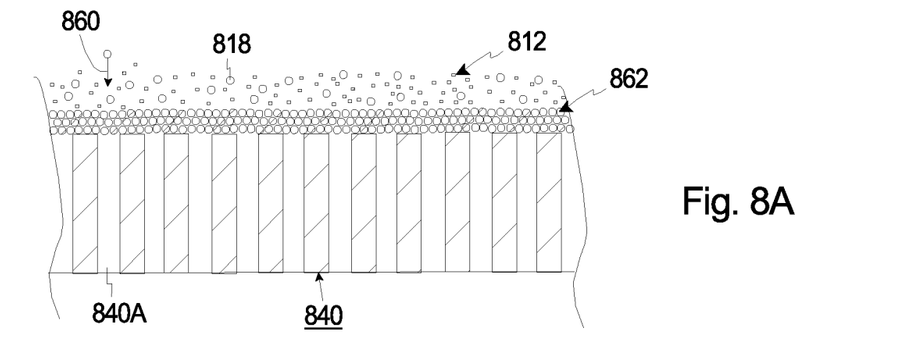
FIG. 8A illustrates the flow restriction assembly during a fourth clogging behavior.

FIG. 8A is a simplified illustration of a portion of the flow restriction assembly 840 (in cut-away) having the plurality of flow passageways 840A, with a fourth slurry 812 (illustrated with small squares and circles) including fourth particles 818 directed from top to bottom (illustrated with an arrow 860) through the flow restriction assembly 840. In this example, the fourth particles 818 are small, and have diameters that are smaller than the diameter of the flow passageways 840A. However, fourth particles 818 tend to form sediments that starting from the top of the flow restriction assembly 840 eventually cover up the whole flow restriction assembly 840 to fully block the flow passageways 840A. As a result thereof, each flow passageway 840A will gradually be plugged. This type of clogging behavior is referred to herein as cake filtration clogging behavior 862. With cake filtration clogging behavior 862, the fourth particles 818 are small and tend to form sediment easily. The cake filtration behavior 862 can be referred to as the fourth clogging behavior.

Figure 8B:
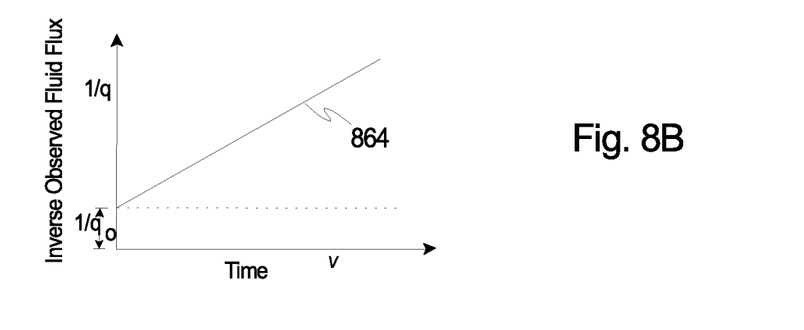
FIG. 8B illustrates a fourth fluid flux profile.

FIG. 8B is a graph that plots a fluid flux profile 864 that occurs during the cake filtration clogging behavior 862 (illustrated in FIG. 8A). In FIG. 8B, the inverse of the observed fluid flux (1/q) is plotted relative to the passed fluid volume per area of the flow restriction assembly (v). As illustrated in FIG. 8B, the inverse of the observed fluid flux of the slurry increases linearly (for cake filtration clogging behavior) as the amount of flow through the flow restriction assembly increases. In FIG. 8B, $1/q_0$ is the inverse of the initial value of the observed fluid flux q, and the inverse of the observed fluid flux has a slope of $K_c$, where $K_c$ is some positive value. The fluid flux profile 864 illustrated in FIG. 8B can be referred to as the fourth fluid flux profile.

With reference to FIGS. 5A-8B, the rate and method in which the slurry 12 clogs the flow restriction assembly 40 will vary according to the type and composition of the slurry 12. In one embodiment, for an unknown slurry 12, the present invention evaluates the fluid flux profiles of the slurry to determine what type of clogging behavior is happening at the flow restriction assembly 40. Once the clogging behavior of the slurry 12 is determined, the particle count, particle size and agglomeration of the slurry 12 can be estimated. By doing so, the proposed scheme connects observation with particle behaviors in the slurry which reflects its particle contents properties, such as particle counts, size, and agglomeration. For instance, if an observed clogging behavior is categorized as complete clogging behavior, it indicates existence of a significant number of large particles that plug up the pores at their entrances. It also implies that the particles are well dispersed and less likely to adhere to each other, i.e. agglomerate, because otherwise the observed clogging behavior should be categorized as intermediate clogging behavior. If an observed clogging behavior is categorized as a standard clogging behavior, it indicates that although there may not exist a significant number of large particles, there are small particles that have the tendency to adhere to inner walls of the pore tubes, i.e. capillaries, and also adhere to each other, i.e. agglomerate. Lastly, if an observed clogging behavior is categorized as the cake filtration clogging behavior, it indicates that there are mid-size particles that have the tendency to collectively form layers covering the entire flow restriction assembly with or without the pores, also implying agglomeration.

FIGS. 9A-9D illustrate alternative fluid flux profiles for an unknown slurry. More specifically, (i) FIG. 9A includes a first fluid flux profile 964A that plots the observed fluid flux normalized by pressure differential across the flow restriction assembly (q/ΔP) relative to a passed fluid volume per area of the flow restriction assembly (v) for the unknown slurry; (ii) FIG. 9B includes a second fluid flux profile 964B that plots logarithm of the observed fluid flux normalized by pressure differential across the flow restriction assembly (q/ΔP) relative to a passed fluid volume per area of the flow restriction assembly (v) for the unknown slurry; (iii) FIG. 9C includes a third fluid flux profile 964C that plots the square root of observed fluid flux normalized by pressure differential across the flow restriction assembly (q/ΔP) relative to a passed fluid volume per area of the flow restriction assembly (v) for the unknown slurry; and (iv) FIG. 9D includes a fourth fluid flux profile 964D that plots the inverse of the observed fluid flux normalized by pressure differential across the flow restriction assembly (q/ΔP) relative to a passed fluid volume per area of the flow restriction assembly (v) for the unknown slurry.

It should be noted that dashed line 900 in each of these Figures represents when the onset of blockage occurs.

As provided herein, for each unknown slurry, the four alternative plots can be generated, each with a different vertical axis. Subsequently, the plot with the most linear sections can be selected as the estimated blocking behavior. For example, with reference to FIGS. 9A-9D, the plot 964A in FIG. 9A has the most linear sections. This plot 964A corresponds to the complete clogging behavior. Thus, the unknown slurry is estimated to have complete clogging behavior.

Figure 9A:
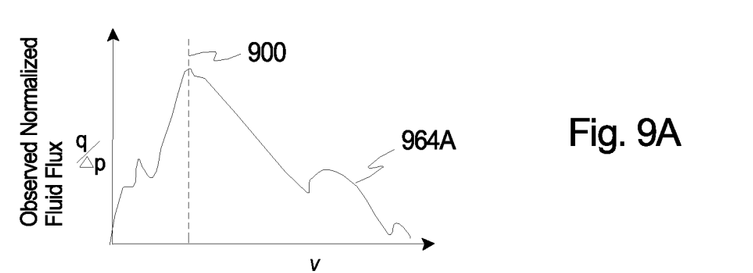
FIGS. 9A-9D illustrate alternative fluid flux profiles for a slurry.
Figure 9B:
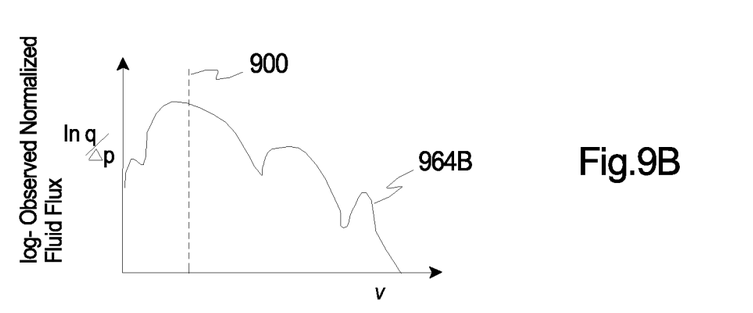
Figure 9C:
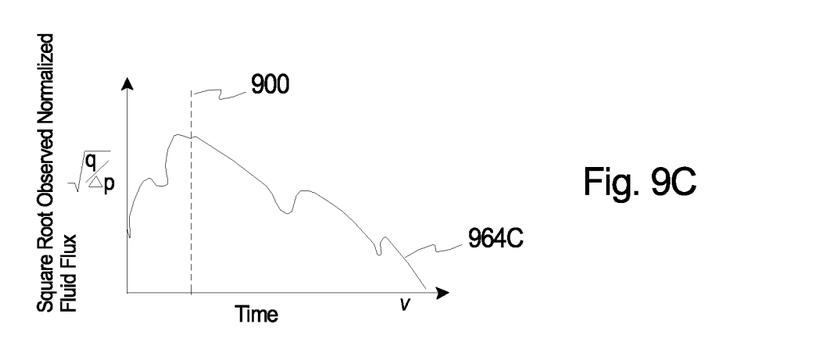
Figure 9D:
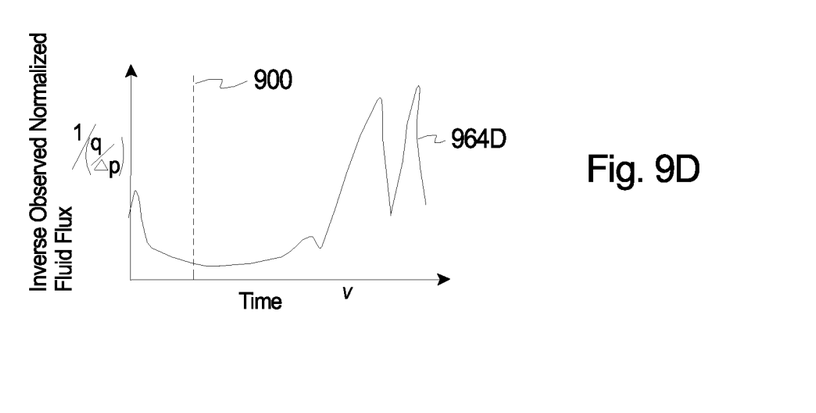

Further, because the unknown slurry has complete clogging behavior, it indicates existence of a significant number of large particles that plug up the pores at their entrances. It also implies that the particles are well dispersed and less likely to adhere to each other, i.e. agglomerate.

FIGS. 10A-10D illustrate alternative fluid flux profiles for the unknown slurry (tested above with reference to FIGS. 9A-9D) making a second pass through a clean flow restriction assembly. More specifically, (i) FIG. 10A includes a first fluid flux profile 1064A that plots the observed fluid flux normalized by pressure differential across the flow restriction assembly (q/ΔP) relative to a passed fluid volume per area of the flow restriction assembly (v) for the unknown slurry; (ii) FIG. 10B includes a second fluid flux profile 1064B that plots logarithm of the observed fluid flux normalized by pressure differential across the flow restriction assembly (q/ΔP) relative to a passed fluid volume per area of the flow restriction assembly (v) for the unknown slurry; (iii) FIG. 10C includes a third fluid flux profile 1064C that plots the square root of observed fluid flux normalized by pressure differential across the flow restriction assembly (q/ΔP) relative to a passed fluid volume per area of the flow restriction assembly (v) for the unknown slurry; and (iv) FIG. 10D includes a fourth fluid flux profile 1064D that plots the inverse of the observed fluid flux normalized by pressure differential across the flow restriction assembly (q/ΔP) relative to a passed fluid volume per area of the flow restriction assembly (v) for the unknown slurry.

It should be noted that dashed line 1000 in each of these Figures represents when the onset of blockage occurs.

As provided herein, for the second pass of the unknown slurry, the four alternative plots 1064A-1064D are generated and evaluated. With reference to FIGS. 10A-10D, the plot 1064C in FIG. 10C has the most linear sections. This plot 1064 corresponds to the standard clogging behavior. Thus, the second pass of unknown slurry is estimated to have standard clogging behavior.

Figure 10A:
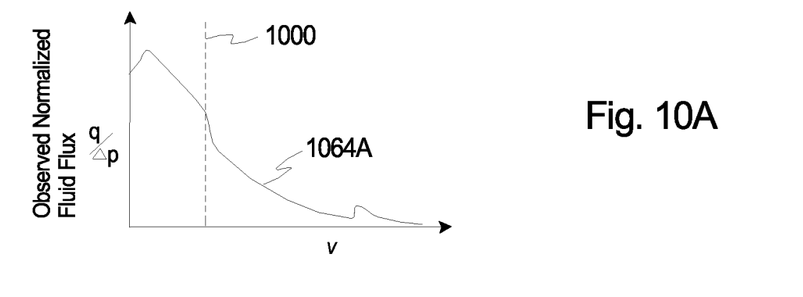
FIGS. 10A-10D illustrate alternative fluid flux profiles for a slurry.
Figure 10B:
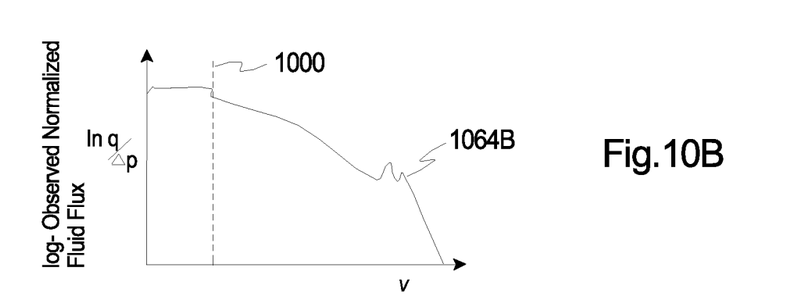
Figure 10C:
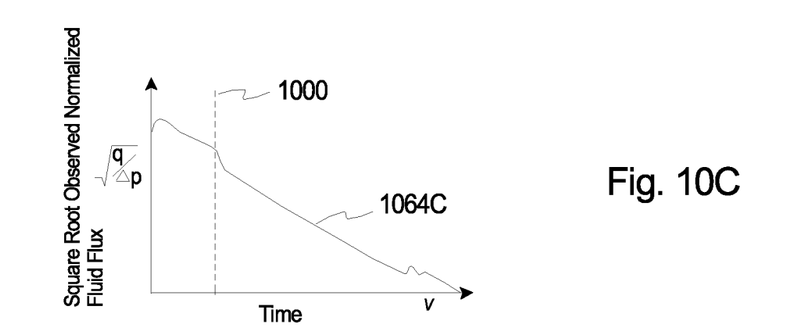
Figure 10D:
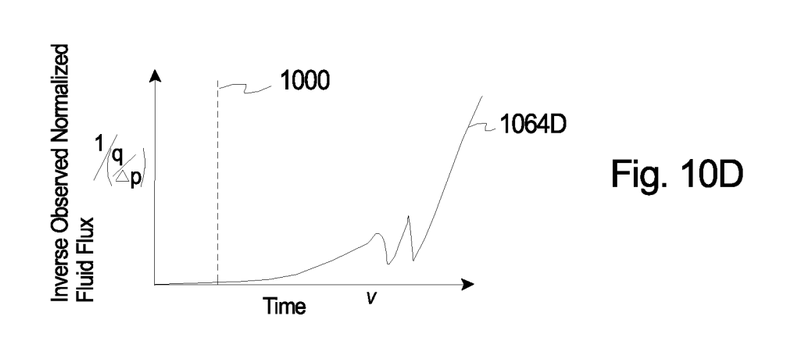

Because the second pass of the unknown slurry has standard clogging behavior, this indicates that at this time, there may not exist a significant number of large particles, there are small particles that have the tendency to adhere to inner walls of the pore tubes, i.e. capillaries, and also adhere to each other, i.e. agglomerate.

Comparing the results from FIGS. 9A-10D, the present invention was able to evaluate how the unknown slurry changed over time.

It should be noted that the proposed scheme can provide microscopic insight into particle contents properties of the monitored slurry, such as particle counts, size, and agglomeration, without the need for pre-manipulation, but also track the changes in the properties that have taken place with the monitored fluid while subjected to processing. To conclude, the proposed scheme realizes sensitive and robust monitoring of the key properties of the slurry, i.e. viscosity and particle contents that are particularly relevant to slurries and particle dispersions with challenging conditions, such as high particle concentrations.

While the particular assembly as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A slurry analysis system for estimating a first characteristic of a slurry that includes a plurality of particles suspended in a dispersion medium, the slurry analysis system comprising:
   a flow restriction assembly;
   a sensor assembly that senses a sensed condition of the slurry as it flows through the flow restriction assembly; and
   a control and analysis system that estimates the first characteristic of the slurry based on the sensed condition;
   wherein the control and analysis system selects a selected clogging behavior using the sensed condition, and estimates the first characteristic based on the selected clogging behavior.

2. The slurry analysis system of claim 1 wherein the control and analysis system estimates an observed fluid flux using the sensed condition and selects the selected clogging behavior using the observed fluid flux.

3. The slurry analysis system of claim 2 wherein the sensor assembly measures a pressure differential across the flow restriction assembly over time, and a flow rate through the flow restriction assembly over time, and the control and analysis system estimates the viscosity versus time using the pressure differential and flow rate.

4. The slurry analysis system of claim 2 wherein the control and analysis system uses the observed fluid flux to select the selected clogging behavior between a first clogging behavior and a second clogging behavior.

5. The slurry analysis system of claim 4 wherein the control and analysis system estimates the observed fluid flux using the following formula:

$$q = \frac{dv}{dt}$$

wherein (i) q is the observed fluid flux; and (ii)

$$\frac{dv}{dt}$$

is the time derivative of the passed fluid volume per area of the flow restriction assembly.

6. The slurry analysis system of claim 1 wherein the control and analysis system estimates at least one of particle count, particle size and agglomeration using the selected clogging behavior.

7. The slurry analysis system of claim 1 wherein the control and analysis system estimates a particle count, a particle size and agglomeration using the selected clogging behavior.

8. The slurry analysis system of claim 1 wherein the flow restriction assembly includes a capillary array.

9. The slurry analysis system of claim 1 wherein the flow restriction assembly includes a filter.

10. A manufacturing assembly that includes a manufacturing system, and the slurry analysis system of claim 1.

11. A slurry source that includes a receptacle that retains the slurry, and the slurry analysis system of claim 1.

12. A method for estimating a first characteristic of a slurry that includes a plurality of particles suspended in a dispersion medium, the method comprising:
   directing the slurry at a flow restriction assembly;
   sensing a sensed condition of the slurry with a sensor assembly as it flows through the flow restriction assembly;
   estimating the first characteristic of the slurry based on the sensed condition with a control and analysis system; and
   selecting a selected clogging behavior with the control and analysis system using the sensed condition; and
   wherein estimating the first characteristic includes using the selected clogging behavior.

13. The method of claim 12 including estimating an observed fluid flux with the control and analysis system using the sensed condition, and wherein selecting a selected clogging behavior includes using the observed fluid flux.

14. The method of claim 13 the selecting a selected clogging behavior includes using the observed fluid flux to select the selected clogging behavior between a first clogging behavior and a second clogging behavior.

15. The method of claim 12 including estimating at least one of particle count, particle size and agglomeration with the control and analysis system using the selected clogging behavior.

* * * * *